United States Patent [19]

Urban

[11] 3,915,564
[45] Oct. 28, 1975

[54] RETINAL IMAGE-DISPLAY SYSTEM

[75] Inventor: Julius C. Urban, North Hollywood, Calif.

[73] Assignee: Carl Zeiss-Stiftung, Oberkochen, Germany

[22] Filed: Sept. 12, 1974

[21] Appl. No.: 505,503

[52] U.S. Cl. .................................. 351/7; 354/62
[51] Int. Cl.[2] .......................................... A61B 3/14
[58] Field of Search ........................... 351/7; 354/62

[56] References Cited
UNITED STATES PATENTS
3,533,342  10/1970  McMillin .............................. 351/7

OTHER PUBLICATIONS
Olga M. Ferrer, "Serial Fluorescein . . . Circulation," Am. J. Ophthalm, Vol. 60, No. 4, Oct. 1965, pp. 587–591.

Primary Examiner—Paul A. Sacher
Attorney, Agent, or Firm—Nichol M. Sandoe

[57] ABSTRACT

The invention contemplates a fundus or the like camera wherein the same incandescent-lamp source may serve to suitably illuminate a retinal field for visual viewing and for video viewing, the arrangement being such that video viewing at substantially elevated field-illuminated level is automatically achieved from the same lamp source, upon selective displacement of a simple element which determines whether the viewing is to be visual or through video techniques.

20 Claims, 6 Drawing Figures

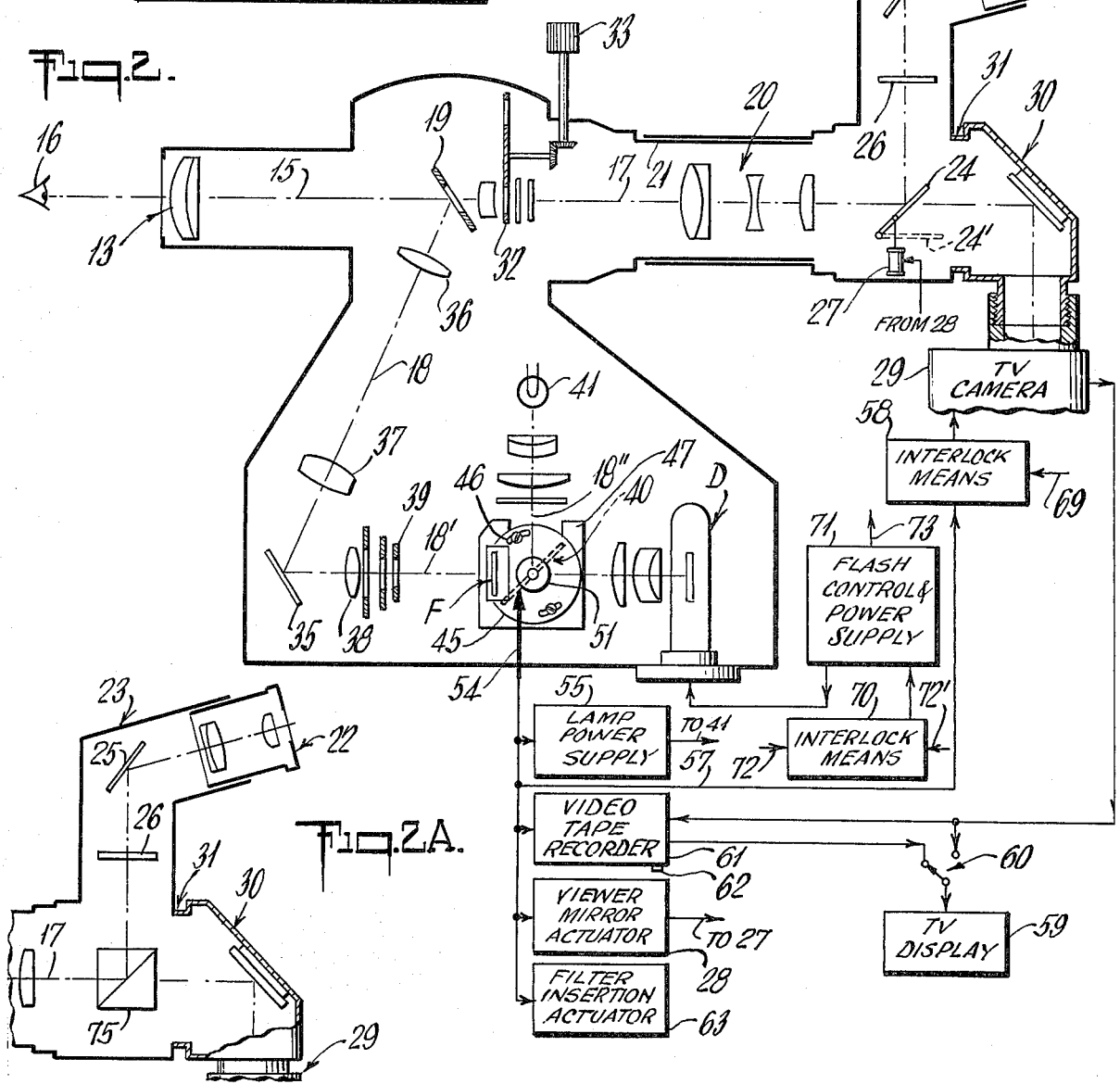

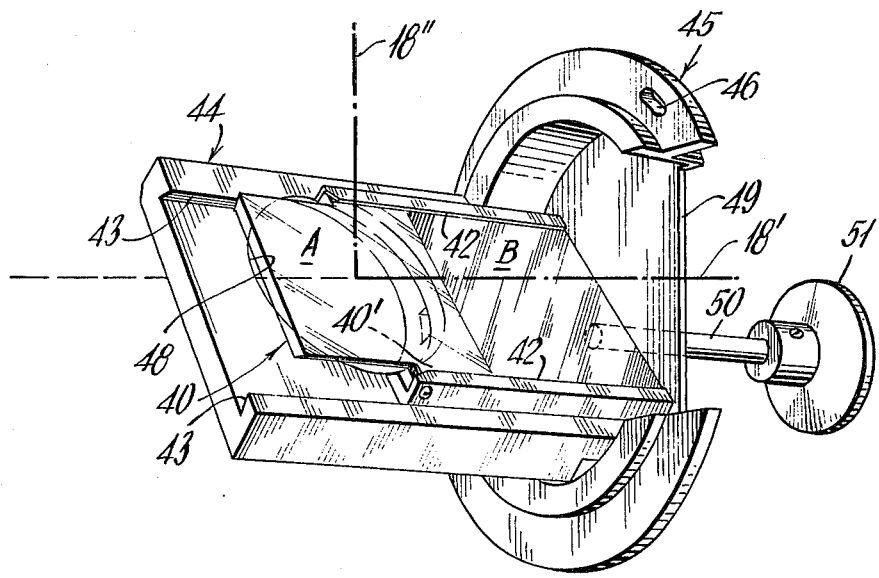
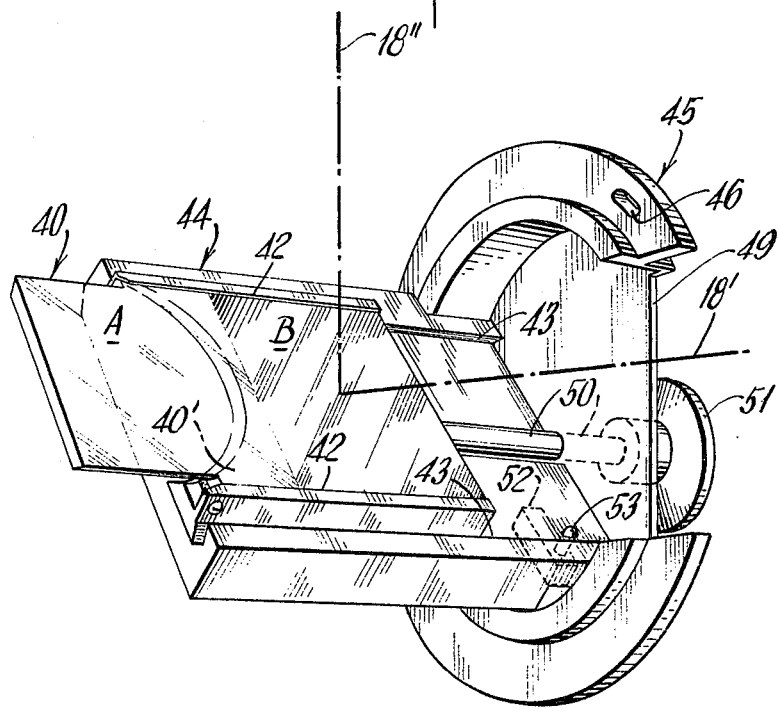

RETINAL IMAGE-DISPLAY SYSTEM

This invention relates to ophthalmological devices and in particular to a fundus or the like camera, for viewing and display of retinal images.

Various attempts have been made to modify existing fundus cameras for television-monitor presentation and for immediate playback, in aid of fluorescein angiography studies of the retina, but as far as I am aware all such modifications have restricted the camera to more or less single-purpose use. The ideal modification would retain all features used for regular retinal examination, it would accommodate all types of retinal photography, and it would display fluorescein angiography on a television screen; but the basic limitation to such an ideal system has been inadequacy of the illumination system.

It is, accordingly, an object of the invention to provide an improved ophthalmological device of the character indicated.

Another object is to provide a fundus camera approaching the above-noted ideal system.

A specific object is to provide means in conjunction with a fundus camera whereby a given light source may compatably serve a video-viewing device, as in fluorescein angiography, as well as one or more viewing devices, such as for visual viewing and/or camera photography of a retinal field.

A general object is to achieve the above objects with basically simple elements, lending themselves to low-cost modification of existing fundus cameras of various types, as well as to new camera construction.

Other objects and various further features of novelty and invention will be pointed out or will occur to others skilled in the art from a reading of the following specification, in conjunction with the accompanying drawings. In said drawings, which show, for illustrative purposes only, preferred forms of the invention:

FIG. 1 is a simplified view in side elevation of a fundus camera embodying the invention;

FIG. 2 is an enlarged view from the same aspect of FIG. 1 but primarily schematically showing the relation of optical and electrical elements within the camera;

FIG. 2A is a fragmentary view similar to FIG. 2 to show modification of a part thereof;

FIGS. 3 and 4 are similar perspective views of a portion of the camera of FIGS. 1 and 2, to show different selected parts relationships; and FIG. 5 is a fragmentary view in perspective to illustrate a modification.

Referring first to FIGS. 1 and 2, the invention is shown in application to a fundus camera comprising a housing 10 adjustably positioned by bracket means 11 over a supporting and manipulating table 12. Objective-lens means 13 is carried at the forward end of supporting-tube structure 14 on a generally horizontal axis 15, for viewing the field, namely, the internal surface of the retina of a living eye 16; the basic supporting structure will be understood to include the usual brackets, chin rest and arms (not shown) whereby the patient's eye 16 may be correctly positioned and held at a given focusing distance from the lens system 13. The legend 15 identifies that portion of the optical system along which a viewing axis 17 and an illumination axis 18 are coincident, the same being folded into coincidence by a centrally apertured flat annular mirror 19; it will be understood that field-viewing use of lens means 13 is on axis alignment 15–17 via the aperture in mirror 19, and that field-illumination use of lens means 13 is on axis alignments 18–15 via the reflecting annular surface of mirror 19. For visual viewing, further objective-lens means 20 is shown carried by a rearwardly extending tube 21, and an offset eyepiece 22 is positioned by a housing adapter 23, being served from axis 17 via offsetting mirrors 24–25 and an eyepiece reticule 26.

Mirror 24 is hinged on a fixed horizontal axis, being shown raised to its upper limited position, for visual viewing through eyepiece 22 along the viewing axis 17; solenoid means suggested at 27, may be employed to position mirror 24, based upon the output of actuator means 28 to be later described. In its "down"-actuated position (dashed outline 24'), mirror 24 allows video viewing along axis 17, a TV camera 29 being shown vertically oriented in its connection to a 90° reflecting mount 30 to the housing adapter 23. Preferably, the mount 30 is detachably connected at 31 to the adapter 23, as by bayonet formations common to high-grade 35-mm photographic camera bodies to permit selective placement of such a photographic camera body in place of the TV camera 29 and its mount 30. To complete the description of parts along viewing axis 17, means such as a rotatable disk support 32, positioned by manual operation of suitable means 33, will be understood to selectively place a correction-lens element and/or an astigmatism-compensating element on axis 17, as appropriate for the fact that the retinal field is being viewed through possibly deficient lens structure in the patient's eye 16.

The illumination axis 18 is folded at mirror 35 to a horizontal alignment of a part 18' thereof, being served by various lenses 36-37-38 and by field-stop means 39, the selective manipulation of which is externally available at a knob C (FIG. 1). The 90° reflection response axis 18'' from a 45° glass plate 40 continuously directs light from an incandescent-lamp source 41 and along the illumination axis 18'-18-15, and the substantial transparency of plate 40 enables use of flash-tube means D on the axis 18', as when making photographic exposures (i.e., when a photographic camera is secured at 31, in place of the TV camera 29). Filter means F, selected as appropriate for the desired viewing technique and response, is manually or automatically insertable transverse to axis 18', as will be understood.

It is a feature of the invention, more fully and additionally illustrated by the unit-handling subassembly of FIGS. 3 and 4, that the glass plate 40 shall be so constructed, so manipulable, and so coordinated with the functioning of other elements already described, that the same lamp 41 may compatibly serve both visual-viewing purposes (eyepiece 22) and video-viewing purposes (TV camera 29), with appropriate change in field-illumination intensity, in the order of at least 10:1. To this end, the glass plate 40 is part of or mounted upon a slide body 40', and is firmly mounted between parallel side-channel members 42; body 40' is guided by dovetail ways 43 in a frame member 44. A dished and flanged mounting plate 45 is firmly secured to and therefore provides a base for cantilevered support of frame member 44; arcuate mounting slots, as at 46 in the outer flange of plate 45, enabling small corrective angular positioning adjustment of plate 45 in its mount to a frame bracket system 47 (FIG. 2) which will be understood to be secured to or otherwise a fixed part of the housing 10, the mounting adjustment being such that correct reflective registration is achieved for axes 18'-18".

Between ways 43, the frame member 44 has a flat bottom which, on the axis alignment 18', has a large elliptical opening 48; this opening has a circular projection when viewed along axis 18' and is for the purpose of accommodating flash-tube light from means 42 when making flash-photographic exposures. In its retracted position (FIG. 3), a "transparent" half or area A of plate 40 is positioned over the entire circular projection of opening 48, and in its projected position (FIG. 4), an opaque and fully reflecting "mirror" half or area B of plate 40 is positioned over the entire circular projection of opening 48; for the case of an optically flat glass plate 40, of 3-mm thickness, there is approximately a 10:1 difference in reflectance at B as compared to A, and for the 45° incidence involved for both axes 18'-18" with respect to the glass surface.

To complete a description of the subassembly of FIGS. 3 and 4, a rectangular cut-out 49 on one side of the mounting plate 45 will be understood to accommodate the filter-insertion guide and slide system already alluded to in connection with filter means F. Plate 40 and its supporting slide body 40' may be motor-positioned in its translation from one to the other of the positions of FIGS. 3 and 4, but in the form shown, a simple rod connection 50 to an externally accessible knob 51 suffices. Finally, a limit-switch body 52, mounted to the cupped bottom of plate 45, carries a probe 53 poised to develop a change in switched state whenever slide 40' is in its lesser-reflecting condition (FIG. 3).

Circuit elements of FIG. 2 show coordinating relationships for certain automating features which may be used in operation of the described camera. The heavy arrow 54 is symbolic of the output control function available upon change of state of switch 52; thus, upon shift from the lesser-reflectance condition of FIG. 3 to the 10-times greater-reflectance condition of FIG. 4, the output connection 54 from switch 52 may be used to initiate certain operations. At 55, it is indicated that connection 54 may be operative upon the regulated power supply for lamp 41, calling for a temporary overloading of lamp 41 as may be needed for the particular desired video response at 29. Preferably, an on-off switch 56 (FIG. 1) is relied upon to select the operative condition of TV camera 29, but a connection 57 (FIG. 2) from switch output 54 suggests that the mere displacement of plate 40 may be sufficient to activate TV camera 29; such a connection may be viewed as part of a safety-interlock feature, suggested by legend at 58.

Output 54 is further shown operatively connected to actuator means 27, to assure that mirror 24 will be retracted for video-viewing purposes. A TV display monitor may be connected by selector switch means 60 to the video output of TV camera 29, but in FIG. 2 it is shown connected to the output of a video-tape recorder 61, which in turn has an on-off control connection to output 54 to assure tape recording of the video output of camera 29 as long as that output is forthcoming; manually operable means, suggested by a button 62, will be understood to determine the extent to which recorder 62 is called upon to replay video signal to the display 56. Then too, it is indicated at 63 that output 54 may also be used to control an automatic actuator for insertion of the filter F, e.g., the blue filter used in fluorescein angiography, when plate 40 is shifted to use of its full-reflection area B for video viewing.

It will be seen that the described apparatus meets all stated objects. In particular, it brings further versatility to fundus cameras, in that video viewing recording and play back are all instantly available without black-out upon change of light level at the retinal field, upon transfer from eye-piece viewing at 22 to display viewing at 59. The unit-handling nature of the subassembly of FIGS. 3 and 4 brings ready convertability of existing fundus cameras to the new feature at the same time, the simple unit-handling feature enables ready removability of the subassembly, so as to clean the optical parts thereof or to restore the camera to its previous condition.

While the invention has been described in detail for the preferred form of FIGS. 1 to 4, it will be understood that modifications may be made within the scope of the invention. For example, FIG. 5 illustrates a further feature of rapid conversion of the described apparatus to the taking of 35-mm photographs, individually or in predetermined sequence, as desired. In FIG. 5, both the TV camera 29 and its 90° reflecting mount 30 are detachably secured in registration with a first of two spaced openings in a slide plate 65, a standard 35-mm camera body 66 being similarly mounted at the other such opening in plate 65. Plate 65 is slidably positionable in an adapter base 67 having guide means 68 for horizontal shuttle guidance of plate 65; base 67 is detachably securable to the housing adapter 23, as by conventional bayonet-locking. In the position shown in FIG. 5, slide plate 55 has been moved to the right for alignment of the TV viewing axis with axis 17, at which point interlock probe means (symbolized by a heavy arrow 69) and carried by plate 65 and contacting base 67 in the position of such TV-camera response may be operative at 58, in conjunction with the switch output 54, to initiate video viewing and/or recording. In the other shuttle position, to the left and with camera 66 positioned for axis-17 response, the video viewing will have been deactivated by loss of the probe contact 69, and an interlock 70 to the control and power supply 71 for flash-tube D will have been freed by action of a similar probe contact, symbolized by a heavy arrow 72; a second interlock connection 72', provided as by a back contact at switch 52, will be understood to certify return of plate 40 to its A area position on axis 18'. Thereafter, the control means 71 will be operative via its connection 73 to camera 66 to synchronize photographic exposures with flash-illumination of the field, and using a standard motorized film-advance and shutter-release camera attachment 74, the photographic exposures may be in paced sequence, pre-selected as desired.

Still further, within the invention, and with a degree of compromise as to dynamic range of field illumination for television camera (29) response, a split prism 75 may be used at the viewing end of axis 17, in place of the movable mirror 24, as shown in the fragmentary diagram of FIG. 2A. Preferably, the prism 75 is fixedly mounted and so constituted to divide incoming light on axis 17 in greater proportion for video viewing than for visual viewing. Thus, for example, the division at 75 may be approximately 40 percent via mirror 25 to eyepiece 22 and approximately 60 percent via means 30 to the television camera 29. In spite of the indicated compromise, there is of course the advantage for a FIG. 2A arrangement that eyepiece viewing can be employed at all times, whether or not the video end of the system is in use.

What is claimed is:

1. In an opthalmological camera, a housing containing optical elements establishing illuminating and viewing axes at least one of which axes is in part folded for coincidence with a part of the other axis, objective-lens means on the coincident portions of said axes, illuminating means including an incandescent lamp, a visual-viewing device and a video-viewing device mounted to said housing; means including a first reflecting-surface element mounted in said housing for reflectively directing light from said lamp along said illuminating axis, said reflecting-surface element having a plane reflecting surface characterized by a first area of a lesser reflectance and a second area of a greater reflectance, and said reflecting-surface element being selectively positionable to selectively utilize one to the substantial exclusion of the other of said areas to direct lamp light along said illuminating axis; means including a second reflecting-surface element movably mounted in said housing for selectively bringing one to the substantial exclusion of the other of said viewing devices into responsive positioning on said viewing axis; and coupling means so coodinating the selective movements of said first and second reflecting-surface elements that (a) said visual-viewing device is responsive to the field of said objective-lens means for the lesser-reflectance positioning of said first reflecting-surface element, and (b) said video-viewing device is responsive to the field of said objective-lens means for the greater-reflectance positioning of said first reflecting-surface element.

2. The camera of claim 1, in which said illuminating means includes an intensity-varying control for said lamp, said coupling means including an operative connection to said control such that a lesser intensity is operative for the lesser-reflectance positioning of said first reflecting-surface element and that a greater intensity is operative for the greater-reflectance positioning thereof.

3. The camera of claim 2, in which said control is part of regulated power-supply means for said lamp.

4. The camera of claim 1, in which said video-viewing means includes video-recording means, said coupling means including an operative connection to said video-recording means, for the video-viewing condition of said reflecting-surface elements.

5. The camera of claim 1, in which filter insertion-retraction means is carried by said housing at a portion of the illumination axis between said lamp and the location of coincidence with the viewing axis, said insertion-retraction means including an operative connection to said control such that filter-insertion condition prevails on said illumination axis for the greater-reflectance positioning of said first reflecting-surface element.

6. The camera of claim 1, in which said housing includes a detachable-connection formation for selective application of a photographic camera, said video-viewing device being detachably connected to said housing at said formation, and flash-tube means on said illumination axis when said first reflecting-surface element is positioned to utilize the lesser-reflectance area for directing incandescent-lamp light along said illuminating axis.

7. The camera of claim 6, in which said detachable-connection formation comprises a plate having two openings, and guide means coacting between said plate and housing for accommodating selective positioning of one to the exclusion of the other of said openings in an operative alignment with the viewing axis, said video-viewing device being connected to said plate for viewing through one of said openings, and camera-mounting at the other of said openings.

8. The camera of claim 7, in which said coupling means includes interlock means coacting between said slide and frame in the video-viewing position of said slide, said interlock means being so connected to said video-viewing device that the latter is effectively disabled unless in said video-viewing position.

9. The camera of claim 7, in which said coupling means includes interlock means coacting between said slide and frame in the camera-viewing position of said slide, said interlock means being so connected to said flash-lamp means that the latter is effectively disabled unless said slide is in said camera-viewing position.

10. The camera of claim 1, in which said first reflecting-surface element is part of a unit-handling subassembly comprising a frame with means for detachably securing the same to said housing, said plane reflecting surface being part of a slide having guided coaction with said frame along an axis transverse to the geometric plane defined by the axis of incandescent-lamp light incident upon and reflected by said plane reflecting surface.

11. The camera of claim 10, and including externally accessible means for operatively positioning said slide in a selected one of said positions of lesser and greater reflectance.

12. The camera of claim 10, in which said plane reflecting surface is defined on one side of a single glass plate, said plate being mirror-coated only for effectively said greater-reflectance.

13. The camera of claim 12, in which said frame has an aperture aligned with the axis of incandescent-lamp light reflected by said plane reflecting surface, and flash-lamp means on the alignment of the aperture and said last-mentioned axis, whereby in the lesser-reflectance positioning of said slide, said flash-lamp means may be operative to illuminate the field of said objective-lens means, without interfering with otherwise normal incandescent-lamp illumination of the field.

14. In an opthalmological camera, a housing containing optical elements establishing illuminating and viewing axes at least one of which axes is in part folded for coincidence with a part of the other axis, objective-lens means on the coincident portions of said axes, illuminating means including an incandescent lamp, a visual-viewing device and a video-viewing device mounted to said housing; means including a first reflecting-surface element mounted in said housing for reflectively directing light from said lamp along said illuminating axis, said reflecting-surface element having a plane reflecting surface characterized by a first area of a lesser reflectance and a second area of a greater reflectance, and said reflecting-surface element being selectively positionable to selectively utilize one to the substantial exclusion of the other of said areas to direct lamp light along said illuminating axis; and means including a second reflecting-surface element movably mounted in said housing for selectively bringing one to the substantial exclusion of the other of said viewing devices into responsive positioning on said viewing axis; whereby in a first selective placement of said first and second reflecting-surface elements said visual-viewing device may be caused to respond to the field of said objective-lens means for the lesser-reflectance positioning of said first reflecting-surface element, and said video-viewing device may be caused to respond to the field of said objective-lens means for the greater-reflectance positioning of said first reflecting-surface element.

15. In an opthalmological camera, a housing containing optical elements establishing illumination and viewing axes at least one of which is in part folded for coincidence with a part of the other axis, objective-lens means on the coincident portions of said axes, illuminating means including an incandescent lamp, a visual-viewing device and a video-viewing device mounted to said housing; means including a first movable glass element so mounted in said housing with respect to said incandescent lamp and with respect to the illumination axis that in a first position thereof substantially full intensity of light from said lamp is directed along the illumination axis and that in a second position thereof substantially reduced intensity of light from said lamp is directed along the illumination axis; and means including a second movable element mounted in said housing for selectively bringing one to the substantial exclusion of the other of said viewing devices into responsive positioning on said viewing axis; whereby in a first selective placement of said first and second movable elements said visual-viewing device may be caused to respond to the field of said objective-lens means for the lesser-intensity positioning of said first movable element, and said video-viewing device may be caused to respond to the field of said objective-lens means for the substantial full-intensity positioning of said first movable element.

16. As an article of manufacture for selective fixed internal application to the housing of an opthalmological camera as the unit-handling subassembly replacement of a reflector used to direct light from an incandescent source within the camera and along the field-illumination axis of the camera, said article comprising a frame with means for detachably securing the same to said housing, a reflecting surface element having a plane reflecting surface characterized by a first area of a lesser reflectance and by an offset second area of a greater reflectance, said reflecting surface element being part of a slide having guided coaction with said frame along an axis parallel to said reflecting surface and in the direction in which said areas are offset from each other, said frame having an aperture in register (a) with at least a part of one of said areas to the exclusion of the other of said areas when said element is in a first guided position and (b) with at least a part of the other of said areas to the exclusion of said one area when said element is in a second guided position, and means externally projecting with respect to said frame for selectably controlling the guided placement of said plane reflecting surface with respect to said frame one to the other of said positions.

17. In an opthalmological camera, a housing containing optical elements establishing illumination and viewing axes at least one of which is in part folded for coincidence with a part of the other axis, objective-lens means on the coincident portions of said axes, illuminating means including an incandescent lamp, a visual-viewing device and a video-viewing device mounted to said housing; means including a first glass element so mounted in said housing with respect to said incandescent lamp and with respect to the illumination axis that in a first position thereof substantially full intensity of light from said lamp is directed along the illumination axis and that in a second position thereof substantially reduced intensity of light from said lamp is directed along the illumination axis; and means including a second glass element mounted in said housing for bringing said viewing devices into responsive positioning on said viewing axis; whereby in a first selective relative placement of said first and second elements said visual-viewing device may be caused to respond to the field of said objective-lens for the lesser-intensity positioning of said first movable element, and said video-viewing device may be caused to respond to the field of said objective-lens means for the substantial full-intensity positioning of said first element.

18. The camera of claim 17, in which said second glass element is a beam-splitting device, oriented to divide light incoming on said viewing axis into a first path to said visual-viewing device and into a second path to said video-viewing device.

19. The camera of claim 18, in which the beam-splitting device is a beam-splitting prism, dividing light into said first and second paths in a proportion in which said second path receives the preponderant fraction.

20. The camera of claim 17, in which said second glass element is movable between (a) a first position favoring direction of incoming light to said visual-viewing device and (b) a second position favoring direction of incoming light to said video-viewing device.

* * * * *